United States Patent [19]

Labatut et al.

[11] Patent Number: 5,052,176
[45] Date of Patent: Oct. 1, 1991

[54] COMBINATION TURBOJET-RAMJET-ROCKET PROPULSION SYSTEM

[75] Inventors: Josiane M. F. Labatut, Yerres; François M. P. Marlin, Melun; Georges Mazeaud, Yerres; Francois J. Mirville, Melun, all of France

[73] Assignee: Societe Nationale d'Etude et de Construction de Moteurs d'Aviation, Paris, France

[21] Appl. No.: 413,379

[22] Filed: Sep. 27, 1989

[30] Foreign Application Priority Data

| Sep. 28, 1988 | [FR] | France | 88 12645 |
| Sep. 28, 1988 | [FR] | France | 88 12646 |
| Sep. 28, 1988 | [FR] | France | 88 12647 |

[51] Int. Cl.[5] .......................... F02K 9/00; F02K 3/10
[52] U.S. Cl. .............................. 60/225; 60/257; 60/261; 60/267; 60/268
[58] Field of Search .......... 60/224, 225, 226.3, 60/229, 244, 246, 257, 261, 266, 267, 258, 269, 268, 39.162

[56] References Cited

U.S. PATENT DOCUMENTS

| 3,046,742 | 7/1962 | Egbert | 60/246 |
| 3,237,400 | 4/1957 | Kuhrt | 60/246 |
| 3,261,571 | 7/1966 | Pinnes | 60/224 |
| 4,185,457 | 1/1980 | Parker | 60/225 |
| 4,224,790 | 9/1980 | Christensen | 60/224 |
| 4,817,892 | 4/1989 | Janeke | 60/270.1 |
| 4,909,031 | 3/1990 | Grieb | 60/225 |
| 4,930,309 | 11/1988 | Hartman | 60/270.1 |
| 4,934,632 | 6/1990 | Kim | 60/270.1 |

FOREIGN PATENT DOCUMENTS

| 2434273 | 3/1980 | France . |
| 2568316 | 7/1986 | France . |

Primary Examiner—Louis J. Casaregola
Assistant Examiner—John A. Savio, III
Attorney, Agent, or Firm—Bacon & Thomas

[57] ABSTRACT

A propulsion system for a reusable spacecraft is disclosed having turbojet, ramjet and rocket modes of operation. Hydrogen or exhaust gases from a gas generator drives a gas turbine which powers an air compressor in the turbojet mode. An injection device injects hydrogen and exhaust from the gas driven turbine in the combustion chamber in the turbojet mode. In the ramjet mode, only hydrogen is injected into the combustion chamber. In the ramjet mode, hydrogen and oxygen are supplied to the rocket motor. An adjustable nozzle is provided to form a variable throat convergent-divergent nozzle in the turbojet and ramjet modes and to form a divergent nozzle in the rocket mode.

98 Claims, 6 Drawing Sheets

COMBINATION TURBOJET-RAMJET-ROCKET PROPULSION SYSTEM

BACKGROUND OF THE INVENTION

The technical domain of the present invention is propellant systems for spacecraft, such as those contemplated for use at the end of the 20th century and the beginning of the 21st century, which must be able to take off from a horizontal runway, carry a cargo to an altitude in the range of 200 km and at a speed which can exceed mach 20, then descend and land on a horizontal runway.

So that this type of spacecraft may be reusable, it is necessary to provide it with a propellant system which can be used throughout the entire range of flight and of which the operation can be reversible so that the propellant system can then be used again for the return into the earth's atmosphere and the spacecraft will optionally be able to land on any sort of landing terrain.

Spacecraft of this type are being considered for two types of missions. The first type consists of transporting loads into space (to satellites, or to carry provisions for spacecraft remaining in orbit), and then returning to earth to subsequently carry out further missions Another type of mission is the use of the very high speeds and very high altitudes which spacecraft engines can attain to accomplish ultra-speed transport between two distant points on the terrestrial globe.

SUMMARY OF THE INVENTION

To cover the entire range of flight during these types of mission, it is necessary to use three modes of operation, each adapted to one part of the flight, as shown in FIG. 1.

Thus, at the beginning of the flight, up to an altitude which can be as high as 20 to 25 km, and at speeds on the order of mach 5, a first mode of propulsion of the turbojet type will be used, a turbine being driven either by gaseous hydrogen under pressure (expander mode) or by gases from a gas generator, the turbine then driving the turbojet air compressor. The exhaust or leakage gases from the turbine, reinjected into the compressed air stream, are then burned and the combustion gases which are thus formed intensify the thrust of the engine.

In the general range of mach 5, the pressure ratio of the compressor is near one, and the operation of the compressor approaches automatic rotation The engine then passes into a ramjet mode, which drives the spacecraft to a speed in the vicinity of mach 7 and to an altitude which can reach 40 km.

Beyond this speed and altitude, the subsonic combustion ramjet arrangement no longer functions, the air inlet is closed and the engine operates in a rocket mode.

Thus, it is necessary to provide a propellant system which is capable of functioning in all three of these operational modes and it is the purpose of the invention to disclose such a propellant system.

It is important to provide a common structure which allows for the design of propellant systems embodying a combination of different arrangements (thrust, mass, specific impulsion, thrust per unit of frontal surface), each adapted to one type of vehicle and one predetermined mission.

Thus the object of the invention is a structure of a combination a turbojet-ramjet-rocket propellant system which is compatible with feeds of two types of liquid jet propellants:

the first, called expander feed, is comprised of two systems; a hydrogen feed circuit including a heat exchanger allowing heating of the hydrogen before its introduction into a high power turbine in the turbojet-rocket mode, or into a combustion chamber in the ramjet mode; and also an oxygen feed circuit combined with the hydrogen circuit for the rocket mode;

the second comprises two separate feed circuits, for oxygen and hydrogen to a gas generator, said gases from the generator being directed either toward a high power turbine driving a compressor in turbojet-rocket mode, or injected into the combustion chamber in the ramjet mode, or released into the ambient environment in the rocket mode.

In order to realize the most efficient and effective thrust/mass and thrust/frontal surface arrangements, the invention locates the gas driven turbine to power the air compressor inside a central body. The central body, along with an external housing, define an annular combustion chamber and an annular air intake duct in which the air compressor is located. The propellant feed circuits, including the distribution pipe systems, as well as the optional gas generator, are located exterior to the external housing. The turbine is fed gas or jet propellants through structural arms connecting the central body to the external housing, and drives an air compressor which is located upstream from the structural arms. The central body includes a rocket motor which is axially centered in a downstream portion, and is in turn fed jet propellants through the structural arms, and ejects gases into a divergent nozzle system. Both the compressor and the turbine may be of the axial type.

The compressor and the turbine are of the multi-stage type and are contrarotating. The compressor has a first stage upstream, connected by a central shaft to a first turbine rotor having n stages, and a second stage downstream, connected by a second shaft surrounding the first shaft to a second turbine rotor having (n-1) stages overlapping with the stages of the first rotor and turning in the opposite direction.

According to one particular feature of the invention, an injection device is utilized to inject a first portion of the fuel from the central body into the airstream and to accommodate the introduction of a second portion of the fuel into the airstream from externally of the external housing.

The injection device to achieve these objectives comprises a plurality of generally radially extending arms extending between the central body and the external housing. The arms are uniformly distributed about the circumference of the central body and each has an aerodynamic profile with an extrados and an intrados connecting leading and trailing edges. Each of the arms defines at least one radially extending cavity communicating with the gas driven turbine such that exhaust from the gas driven turbine is directed into the internal cavity. Injection orifices defined on the intrados inject the gases into the compressed air stream.

The arms of the injection device may also define two internal cavities wherein each cavity communicates with injection orifices formed on the intrados of the arm. An upstream cavity is in communication with the gas driven turbine such that exhaust gases from the gas driven turbine are directed into the upstream cavity. The downstream cavity communicates with the hydrogen supply circuit such that hydrogen is passed into the downstream internal cavity. The gases are mixed with the compressed air stream through the injection orifices.

The injection device may also comprise a pair of injection rings connected to each of the radial arms and extending generally concentrically about the central body. Each ring may have at least one non-planar surface and define a plurality of injection openings on each of their surfaces, the injection openings being inclined in a downstream direction. Each of the injection rings define first and second internal cavities with the first cavities being in communication with the upstream internal cavities of each of the arms and the second internal cavity being in communication with the downstream internal cavity of each of the arms. Thus, the gases in the internal arms are also passed into the interior of the injection rings to pass into the compressed air stream through the injection openings. This provides an even distribution of the fuel gases throughout the annular duct.

According to another particular feature of the invention, the nozzle system in the turbojet and ramjet operational modes is convergent-divergent and includes means to continuously vary the cross section of the throat of the nozzle. The convergent part of the nozzle is annular and opens into the divergent nozzle portion of the rocket motor by means of movement of a section of the nozzle.

The nozzle system of the propellant system comprises a fixed first, stationary divergent section, a second divergent section which can be retracted and replaced by movable flap means which, with the external housing, forms a convergent-divergent throat with variable cross-section for the gases coming from the annular stream in the turbojet or ramjet modes, and a third, stationary divergent section. In the rocket mode, the three divergent sections are placed in alignment to form a divergent rocket nozzle.

DETAILED DESCRIPTION OF THE PREFERRED EMBODIMENT

Figure 3:
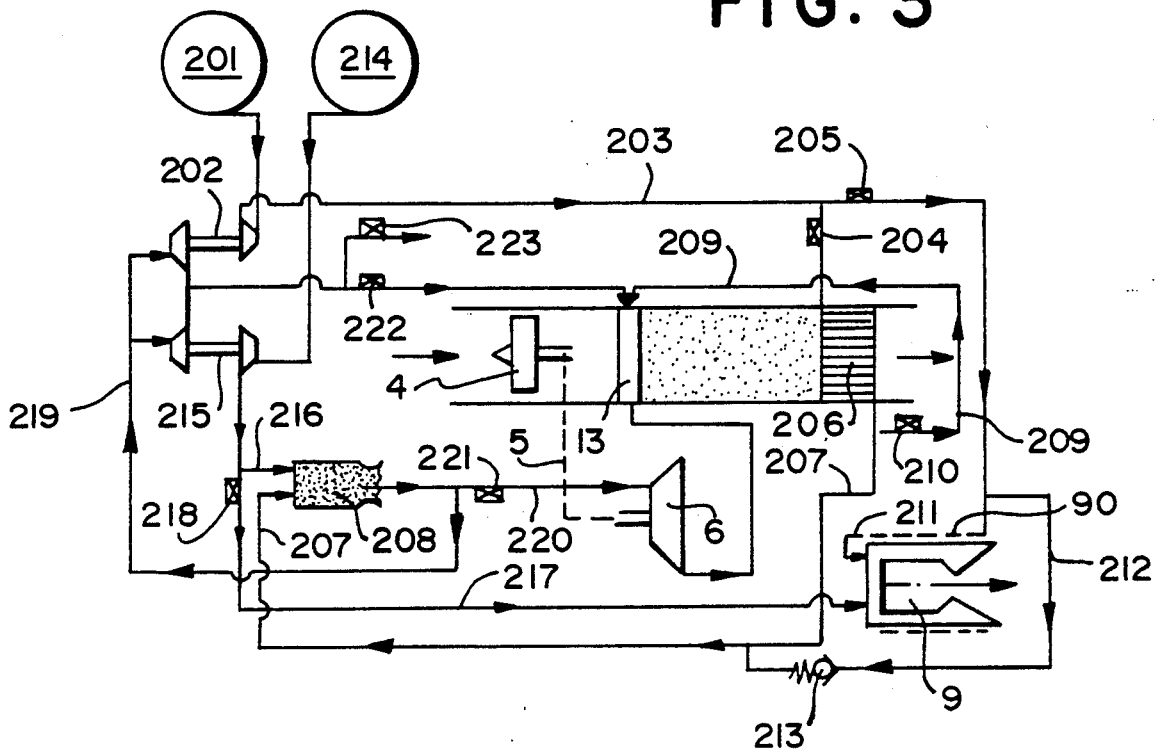
FIG. 3 is a schematic diagram of the propulsion system according to the invention utilizing an alternate, gas generator to supply the propellant for the gas driven turbine.
Figure 4:
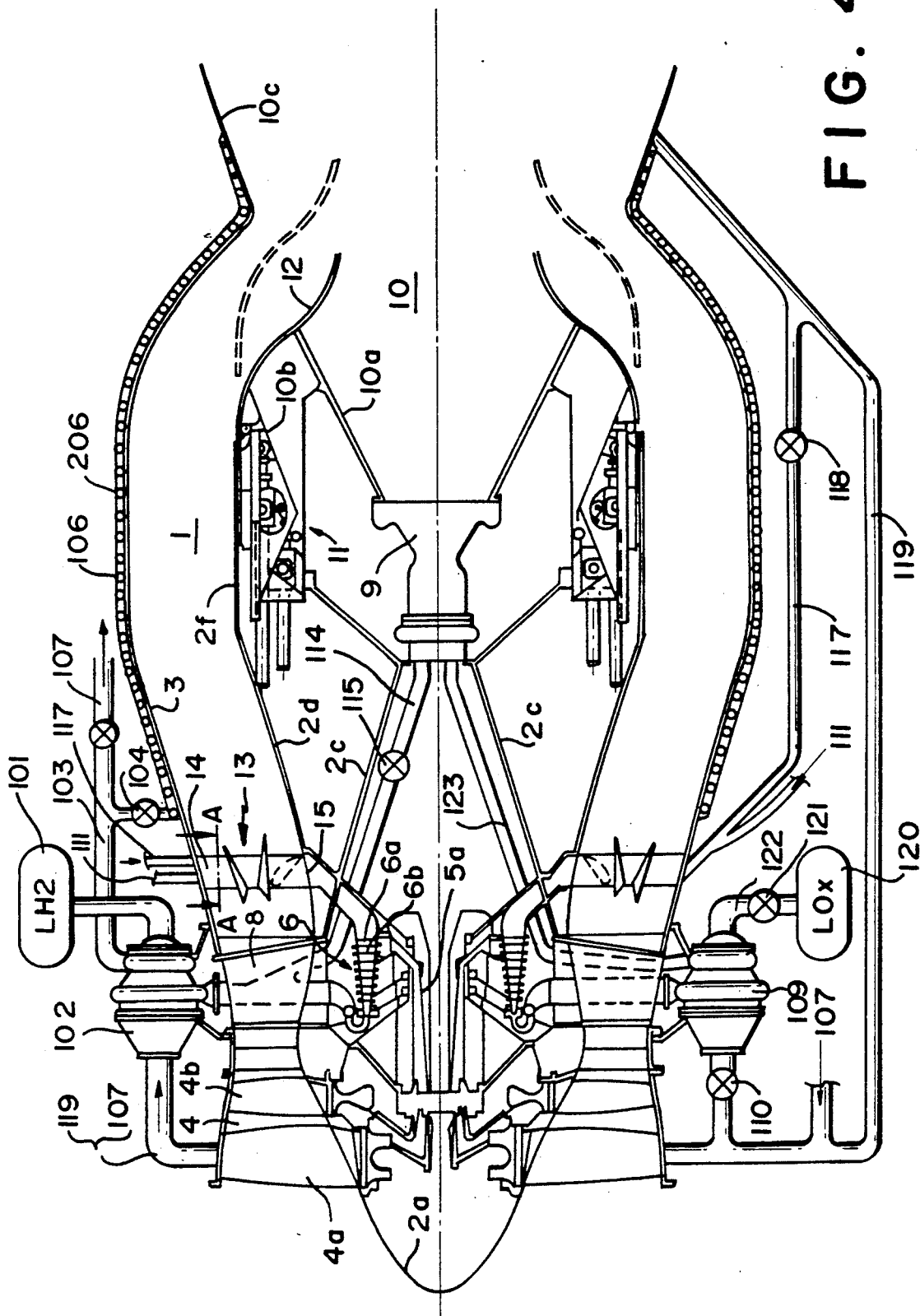
FIG. 4 is a longitudinal cross sectional view of a combination propulsion system according to the invention utilizing an expander circuit.
Figure 5:
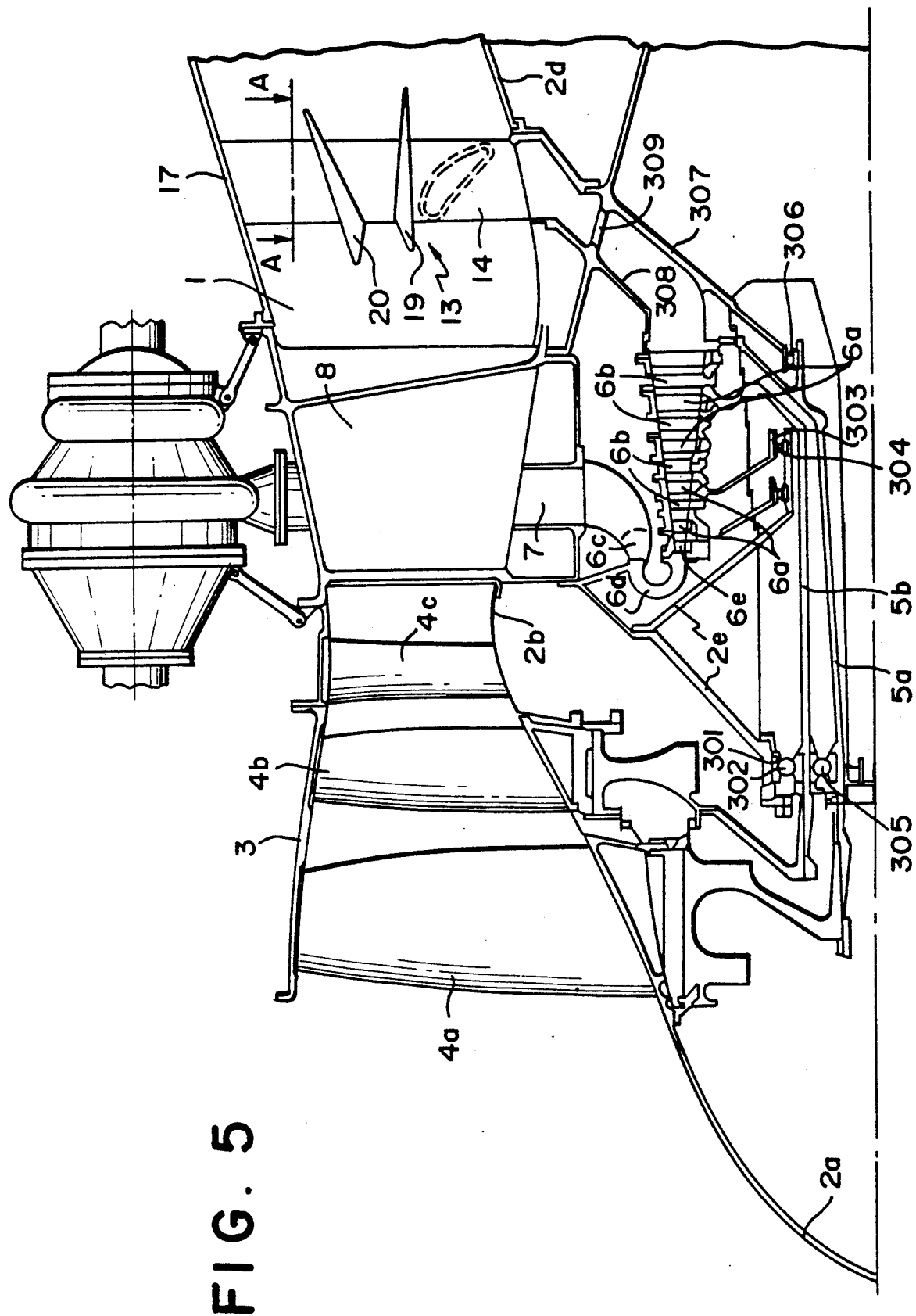
FIG. 5 is an enlarged cross-sectional view similar to FIG. 4 showing the compressor-turbine assembly.

FIGS. 4 and 5 illustrate a combined turbojet-ramjet-rocket propulsion system according to the invention. In this figure, the external propellant feed circuit has been represented as including an expander feed cycle corresponding to the schematic diagram in FIG. 2. The alternative embodiment of a gas generator circuit, illustrated in FIG. 3, may be included in the structure shown in FIGS. 4 and 5 without exceeding the scope of this invention.

The propulsion system defines an annular duct 1 formed between a central body 2 and an external housing 3. An air compressor 4 is located in an upstream portion of the annular duct 1 and comprises two counter-rotating compressor stages 4a and 4b connected by concentric shafts 5a and 5b to the rotors 6a and 6b of gas driven turbine 6. Gas driven turbine 6 is located within the central body 2 downstream from the compressor 4.

Viewed from upstream to downstream, central body 2 is formed by an upstream cone 2a, by platforms of blades of the contrarotating compressor stages 4a, 4b and then by an internal housing 2b providing an inside support to stator vanes of stage 4c. Internal housing 2b is followed by a support assembly formed of structural arms 8, downstream from which is affixed a truncated, double portion. The inside part 2c of this double conical portion is converging in a downstream direction and axially supports rocket motor 9 at is downstream end.

The external part 2d of the double conical portion forms the inside wall of the annular duct 1. Between portions 2c and 2d of the central body 2 are arranged means for varying the cross section of the throat of the convergent-divergent nozzle system in the turbojet and ramjet modes, which will be described in more detail hereinafter.

The central body also includes an upstream internal support member 2e including an internal cylindrical extension 301 mounting an upstream roller bearing 302, inside of which is mounted revolving shaft 5b, connected to stages 6b of turbine 6. Member 2e also has an inside cylindrical extension 303 on which is mounted roller bearing 304 downstream from shaft 5b.

Shaft 5a is rotatably mounted inside shaft 5b on an upstream bearing 305 mounted in a cylindrical extension of shaft 5b, while downstream, shaft 5b revolves inside roller bearing 306, mounted in a bracket of a truncated conical stationary member 307, attached to the inside part 2c of the central body 2.

Gas driven turbine 6 is driven by expansion of the hydrogen (in the case of the expander cycle) or by the gases from generator 208 (the gas generator cycle) fed from one or more gas inlet system(s) 7 opening into a collector ring 6c, the gases being distributed by an annular elbow diffuser 6d through an inlet guide 6e.

The gases which have passed through turbine 6 are discharged between a conical member 308 and member 307. The gases are carried through orifices 309 of part 2c and into manifold 15 on the portion 2d and into injection device 13.

Rocket motor 9 is arranged in a downstream portion of the central body 2 and includes nozzle 10 through which the exhaust gases are ejected. Nozzle 10 has a stationary first divergent section 10a, a second movable divergent section 10b and a stationary third divergent section 10c spaced axially apart from first nozzle section 10a.

The annular duct 1 utilized during the turbojet and ramjet modes of operation opens into nozzle 10 at the space between nozzle sections 10a and 10c occupied by movable section 10b. A retraction device 11 is connected to movable section 10b to retract this portion of the nozzle upstream within the central body 2. A plurality of flaps 12 are located in the duct 1 such that the positions of the flaps are adjustable to vary the cross section of the throat of the convergent/divergent nozzle during the turbojet or ramjet mode of operation.

Figure 2:
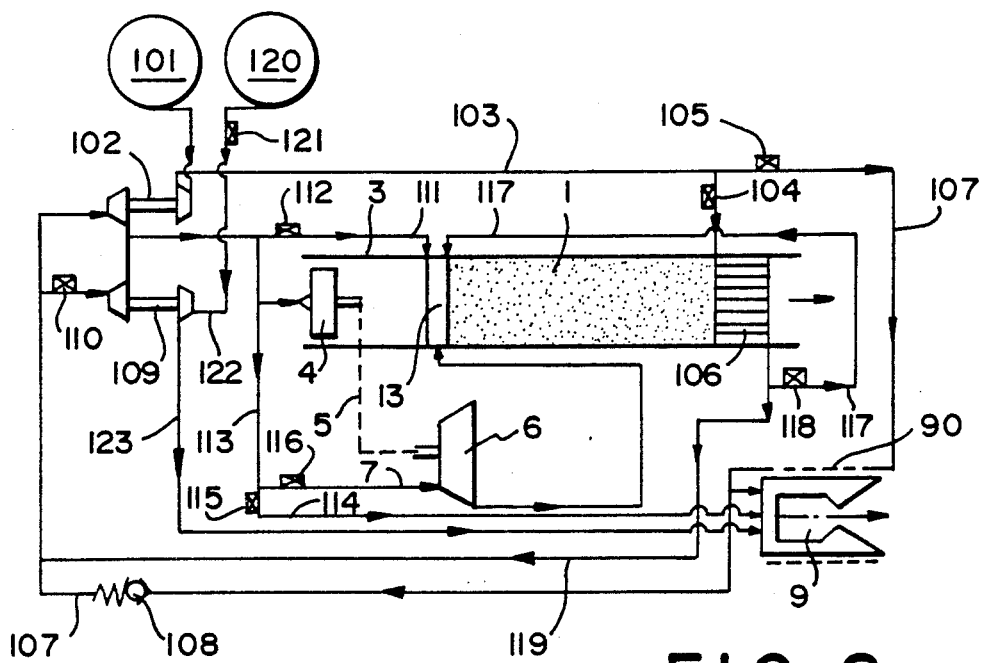
FIG. 2 is a schematic circuit diagram of the propulsion system circuitry including an expander circuit.

The gas driven turbine 6 is supplied with pressurized gas from an external feed circuit (of the type shown in either FIGS. 2 or 3). The pressurized gas is supplied to an upstream part of the gas driven turbine 6 through inlet pipe 7 which passes through structural arms 8 which connect and hold the central body 2 within the external housing 3.

Figure 6:
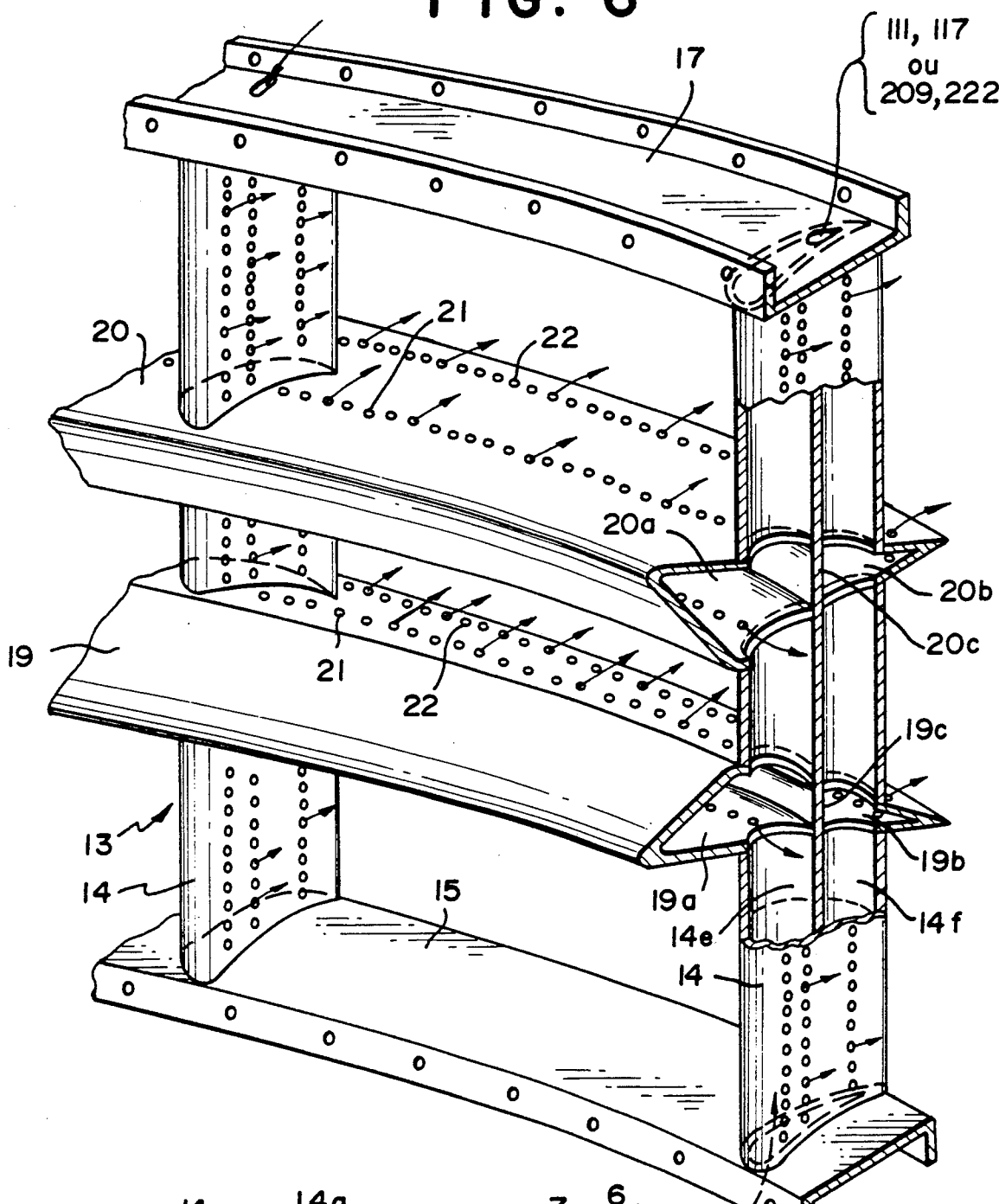
FIG. 6 is a partial, perspective view of the fuel injection device according to the invention.
Figure 6A:
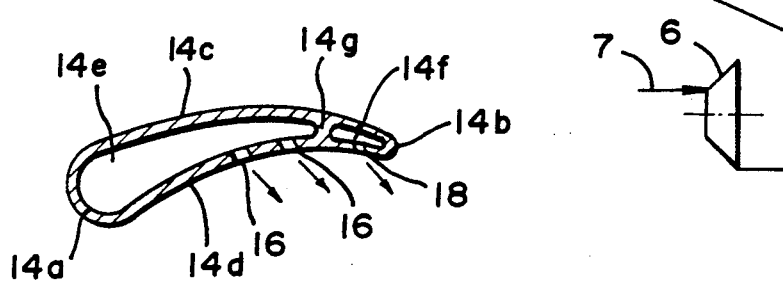
FIG. 6A is a cross section of a radial arm taken along line A—A in FIG. 4.

Upon discharge from the gas driven turbine 6, the exhaust gases are injected into the compressed air stream passing through duct 1 by means of the injection device 13, following which injection the gas mixture is burned in a combustion chamber located within the duct 1. As illustrated in FIGS. 6 and 6A, the injection device 13 comprises a plurality of generally radially extending arms 14 uniformly distributed about the central body 2 and extending across the duct 1. Although, depending upon the size of the propulsion system, any number of such arms may be utilized, it has been found that twenty-four arms distributed every 15° about the central body provides satisfactory results.

Each radial arm 14 has an aerodynamic profile with a leading edge 14a, a trailing edge 14b, an extrados 14c and an intrados 14d. Each of the arms 14 is hollow and has internal partition 14g dividing the interior into an upstream cavity 14e and a downstream cavity 14f. Each of the cavities 14e communicate with an internal supply manifold 15 which, in turn, is connected to the exhaust from gas driven turbine 6. Each of the arms are also connected to exterior manifold 17 with which the downstream cavities 14f communicate. Manifold 17 is connected to the hydrogen feed circuit and allows the hydrogen gas to pass into each of the downstream cavities of the radial arms 14.

Downstream cavities 14f are closed at their radially innermost ends, while upstream cavities 14e are closed at their radially outermost ends. Each of the arms 14 define a plurality of injection orifices 16 located at the furtherest downstream section of the upstream cavity 14e and extending through the intrados 14d. Injection orifices 18 are located on the intrados 14d and communicate with the downstream cavity 14f.

Injection device 13 also comprises 2 injection rings 19 and 20, both of which may possess an aerodynamic profile having at least one non-planar surface. The aerodynamic profile may be symmetrical and may be constant around the entire length of the injection rings. As illustrated in FIG. 2, the innermost ring 19 may be located at approximately one-third the radial length of the arms 14 and have its non-planar surface facing radially outwardly toward the second injection ring 20. Injection ring 20, located at approximately two-thirds the radial length of the arms 14 has its non-planar surface facing inwardly toward injection ring 19. This orientation of the injection rings 19 and 20 creates a low pressure area between the rings and improves the air/fuel mixing.

The injection rings define first internal cavities 19a and 20a which are in communication with the upstream cavities 14e of each of the radial arms 14. The rings also define second internal cavities 19b and 20b which are in communication with each of the downstream cavities 14f of the arms 14. Injection openings 21 are defined by the inner and outer surfaces of the injection rings 19 and 20 in the vicinity of the internal partitions 19c and 20c which separates the first and second cavities of each of the rings. Injection openings 22 are located in the vicinity of the trailing edges of the rings, and the injection orifices 21 and 22 may be inclined in a downstream direction.

Adjustment means 11 are provided to vary nozzle 10. Inside the downstream cylindrical part 2f of the central body 2 are arranged stationary fixed longitudinal rails 16 held on the upstream part of the rocket motor 9 by a ring 16c carried by a conical support 16a and on the downstream end by a conical support 16b.

Figure 1:
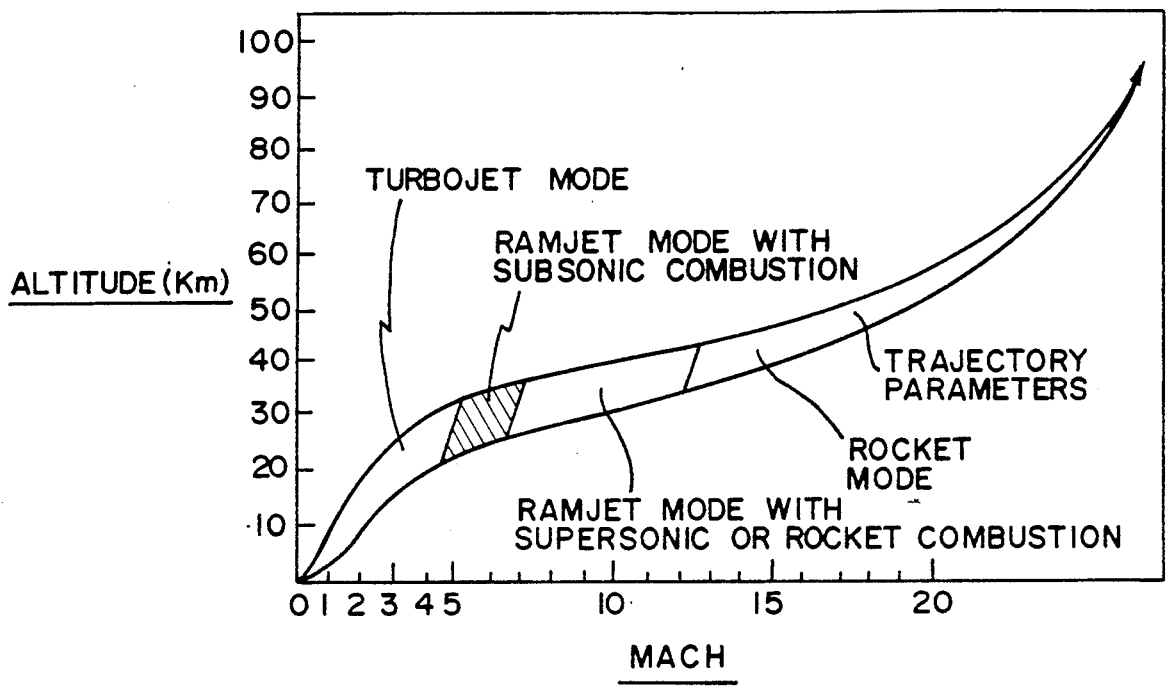
FIG. 1 is a graph showing the range of flight of a spacecraft propelled by a propellant system according to the invention.

Between cylindrical part 2f and rails 16 are mounted a plurality of adjustment assemblies 11. Three assemblies distributed at 120° from one another around the central body may be used or, as shown in FIG. 1, four assemblies distributed at 90° from one another.

Each assembly 11 comprises a first longitudinally arranged jack screw 17 of which the body 17a is affixed on the upstream part of the rail 16 and of which the shaft 17b, directed downstream, is attached to a movable cylindrical ring 18, of suitable configuration to slide in axial translation under part 2f.

Flaps 12 are pivotally attached to the downstream edge of the sliding ring 18 by axle 21 extending through aligned openings in hinge brackets 19 and 20. Movable flaps 12 have a double curve, the first turned toward the axis of the propellant system in the upstream part of the flaps, and the second turned radially outward from the propellant system in the downstream part of the flaps.

The assembly formed of cylindrical ring 18 and flaps 12, which are also movable in axial translation by means of jack screw 17, together with the downstream convergent section 3a of the external housing 3 (which attaches to the divergent section 10c of the nozzle 10) constitute means for forming the convergent-divergent nozzle throat and for varying the cross-section of the throat.

A second jack screw 22, of which the body 22a is attached to a linking member 23 extending between the shaft 17b of the first jack screw 17 and the ring 18, is disposed parallel to the longitudinal axis of the propellant system with its shaft 22b directed downstream. On second jack screw 22 is articulated an intermediate structure 24 movable in axial translation and having rail wheels 25 for rolling on the stationary rail 16. On the downstream part of the movable structure 24 is attached a conical member forming the second, divergent section 10b of the nozzle 10. Shaft 22b is attached to section 10b by connection 26.

Movable structure 24 has two longitudinal guide rails 27 on a radially outer portion, on which slide rail wheels 28 carried by a small rod 29 articulated on the axle 21 between ring 18 and flaps 12, to allow the sliding of the wheels 28 on rails 27. In this manner, during the extension of the shaft 22b of the second jack screw 22, which moves the divergent section 10b of the nozzle downstream, while the first jack screw 17 is in a retracted position, the flaps 12 are retracted and move outward to allow section 10b to move into its operative position. This arrangement allows for the divergent nozzle 10 to be formed when the propellant system passes into the rocket mode of operation.

The operational sequences of the nozzle system is as follows:

In the turbojet operational mode (FIG. 7), the shafts 17b and 22b of the first and the second jack screws 17 and 22 are in their retracted positions and the second divergent nozzle section 10b is retracted within part 2f. Flaps 12 are in positions in which they define a cross-section S1 of the throat of nozzle 10 which is of maximum dimensions for the ejection of gases from the turbojet.

Jack screw 17 is then progressively extended during the acceleration in turbojet mode and into the ramjet mode. At the end of the ramjet mode (FIG. 8), first jack screw 17 is in its completely extended position and second jack screw 22 is retracted. The first movable cylindrical ring 18 is in a downstream position and the flaps 12 are in downstream positions wherein they define a cross-section S2 of the throat of the nozzle which is of minimum dimensions for the ejection of the gases from the ramjet.

Figure 9:
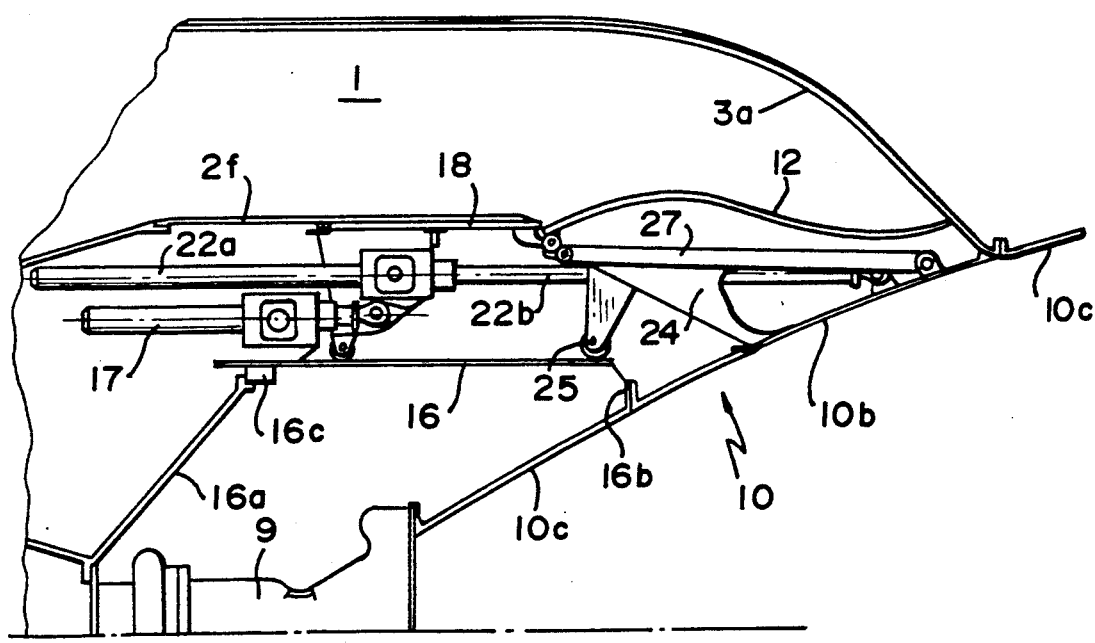

In the rocket mode (FIG. 9), the first jack screw 17 is in a retracted position and shaft 22b of the second jack screw 22 is extended. Flaps 12 are retracted while the second divergent section 10b of nozzle 10 is in its downstream position where it blocks the annular duct 1 and assures the continuity divergent nozzle 10 between the first and third fixed sections 10a and 10c to allow for the ejection of gases from rocket motor 9.

Figure 7:
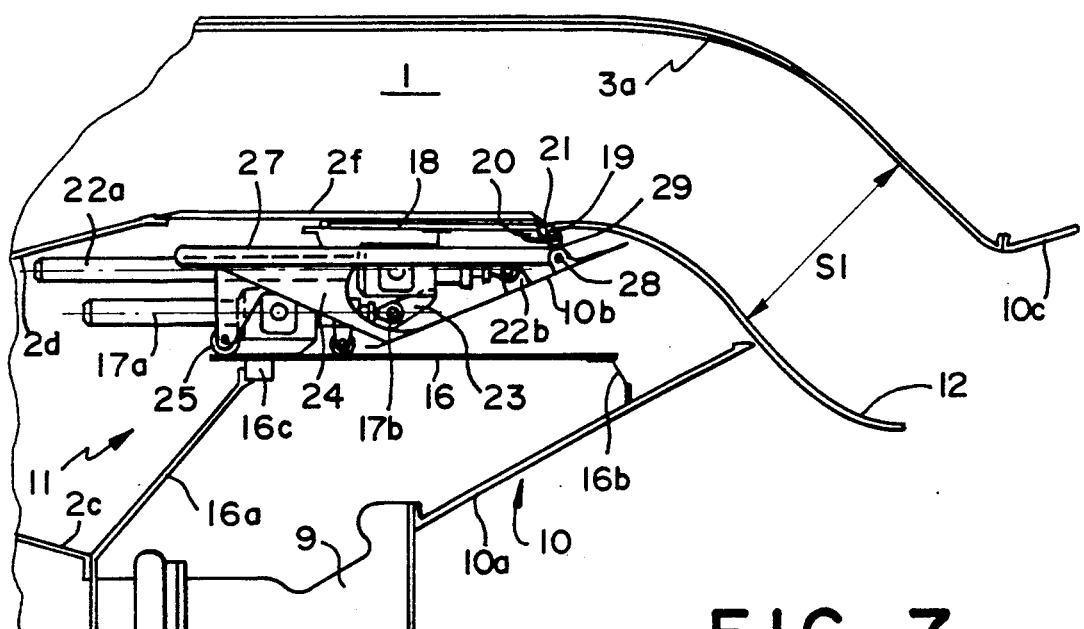
FIGS. 7, 8 and 9 are partial, cross-sectional views showing the positions of the variable nozzle according to the invention.
Figure 8:
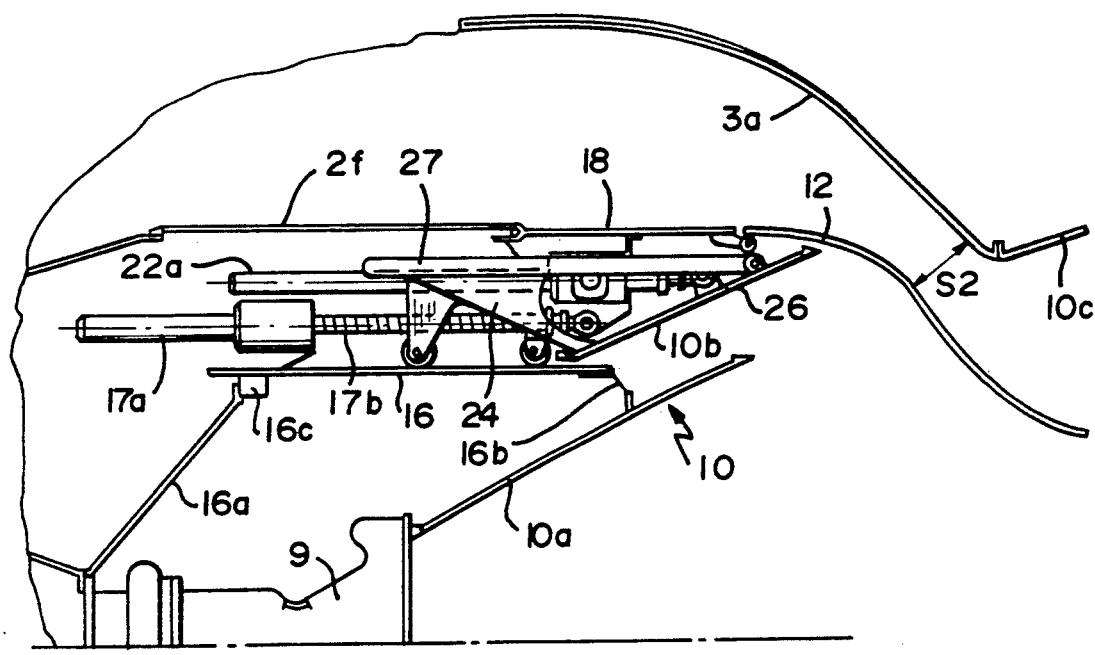

As illustrated in FIGS. 7 and 8, by moving the position of jack screw shaft 17b, it is possible to vary the cross-section of the nozzle throat from its maximum value S1 to its minimum value S2, in a continuous and reversible manner during the transition from the turbojet mode to the ramjet mode and vice versa.

It can also be seen that the retraction of the flaps 12 and the extension of nozzle section 10b to form the divergent rocket nozzle are reversible which allows for the transition as desired from the ramjet mode into the rocket mode and vice versa.

FIGS. 2 and 3 illustrate schematic diagrams of alternative circuits for supplying the pressurized gas to the gas driven turbine, either of which are compatible with the structure described in FIGS. 4-9. In FIG. 2, the feed circuit includes an expander circuit that requires only hydrogen to be utilized in either the turbojet or ramjet operating mode. Liquid hydrogen issues from a storage reservoir 101 and is pumped by means of a turbopump 102 through a pipe distribution system 103 to heat exchanger 106 and distribution circuit 107. The hydrogen passing through the heat exchanger 106 and the distribution system 107 is controlled by valves 104 and 105, respectively. Circuit 107 includes a non-return valve 108 and supplies the hydrogen to the turbines of the turbo pumps 102 and 109. Valve 110 controls the flow of hydrogen to the turbopump 109 and may be closed to isolate this pump from the circuit.

Upon discharge from the turbopumps 102 and 109, the hydrogen (which has been expanded and has consumed a portion of its energy) is separated into two circuits 111 and 113. Circuit 111, which is controlled by valve 112, is connected to the exterior manifold 17 and supplies hydrogen to the downstream cavities 14f of the radial arms 14 as well as second cavities 19b and 20b of the injection rings 19 and 20.

Circuit 113 may be further subdivided into circuits 7 and 114 controlled by Valves 116 and 115, respectively. Circuit 7 feeds the hydrogen to the gas driven turbine 6 while circuit 114 feeds the hydrogen to the rocket motor 9 when the propulsion system is operating in the rocket mode. The exhaust discharge from gas driven turbine 6 is connected to the interior manifold 15 to supply this exhaust gas to the upstream cavities 14e of each of the radial arms 14 as well as the first cavities 19a and 20a of injection rings 19 and 20.

Heat exchanger 106 may be located around the external housing of the propulsion system to cool the engine and to vaporize the hydrogen passing through the heat exchanger. The hydrogen discharged from heat exchanger 106 may be passed into either of two circuits 117 or 119. Circuit 117, controlled by valve 118, is also connected to the exterior manifold 17 to supply hydrogen to the downstream cavities 14f and the second cavities 19b, 20b of the radial arms 14 and the injection rings 19 and 20, respectively. Valve 118 may be opened to supply additional hydrogen to these cavities when the propulsion system is operated in the ramjet mode.

Circuit 119 is connected to the circuit 107 downstream of the non-return valve 108 to supply the hydrogen to the turbopump 102 in the turbojet and ramjet operational modes.

When the propulsion system is operated in the rocket mode, turbopumps 102 and 109 are driven by the hydrogen circulating in circuit 107 after passing through heat exchanger 90 located in the wall of the rocket motor 9. Oxygen from oxygen reservoir 120 is pumped by turbopump 109 through circuit 123 to the rocket motor 9.

The various operational modes are achieved by the opening and closing of the various aforementioned valves to direct the flow of the fuels to the particular portion of the propulsion system necessary to achieve the desired mode. The positions of the valves are summarized in the following table in which the open state is indicated by (O) and the closed state is indicated as (F):

TABLE 1

| OPER-ATIONAL MODE | VALVES | | | | | | | |
|---|---|---|---|---|---|---|---|---|
| | 104 | 105 | 110 | 112 | 115 | 116 | 118 | 121 |
| TURBOJET EXPANDER | O | F | F | F | F | O | O | F |
| RAMJET EXPANDER | O | F | F | O | F | F | O | F |
| ROCKET | F | O | O | F | O | F | F | O |

During startup, the valves are positioned such that the propulsion system operates in the turbojet mode and a known starting device (not shown) drives the turbine of pump 102 such that the entire hydrogen flow passes through heat exchanger 106. Hydrogen, compressed by turbopump 102 and vaporized in heat exchanger 106 drives the turbopump 102 and is then passed into the gas driven turbine 6 to drive air compressor 4. Exhaust from the gas driven turbine 6 is injected into the combustion chamber through cavities 14e of radial arms 14. Simultaneously, since valve 118 is open, cavities 14f of the arms 14 are fed hydrogen directly from the discharge of the heat exchanger 106 to provide cooling of the trailing edges of arms 14 and the injector rings 19 and 20.

In the ramjet mode, gas driven turbine 6 is isolated from the circuits by closing valve 116 and simultaneously opening valve 112 to cause the hydrogen being discharged from the turbine of turbopump 102 to be injected into the downstream cavities 14f and the second cavities 19b and 20b of the injection rings. Since valves 104 and 118 are open, the portion of the hydrogen flow being discharged from heat exchanger 106 which is not used to drive turbopump 102 is injected directly into the cavities 14f by circuit 117.

The operation of the propulsion system in the rocket mode is achieved by closing valve 104 and simultaneously opening valves 105, 110, 115 and 121. The hydrogen issuing from pump 102 through circuit 107 drives the turbines of the turbopumps 102 and 109 and then, through circuits 113 and 114 is injected into the combustion chamber of the rocket motor 9. Oxygen is also injected into the rocket motor 9 via turbopump 109 and circuit 123. I the rocket mode of operation, gas driven turbine 6 is inoperative and the compressor 4 is no longer supplied with air since an air inlet has been closed. The radial arms 14 are also inoperative and are not fed from either the interior manifold 15 or the exterior manifold 17.

The circuit illustrated in FIG. 3 differs from that shown in FIG. 2 insofar as it includes a separate gas generator to supply the pressurized gas to drive the gas driven turbine 6 as well as the hydrogen and oxygen turbopumps. The liquid hydrogen discharged from hydrogen reservoir 201 is pumped through the pump of turbopump 202 into circuit 203. Valves 204 and 205 are arranged to control the flow of hydrogen through heat exchanger 206 and circuits 211, 212, respectively. The hydrogen discharged from heat exchanger 206 is divided into circuits 20 and 209. Circuit 209, controlled by valve 210, supplies the hydrogen to the exterior manifold 17 and into the downstream cavities 14f and the corresponding cavities of the injection rings 19 and 20.

The hydrogen in circuit 207 is directed into the gas generator 208. The circuit controlled by valve 205 is subsequently subdivided into circuits 211 and 212. Circuit 211 supplies hydrogen to the rocket motor 9 after passing through heat exchanger 90. Circuit 212 is connected to the circuit 207 through one-way, non-return valve 213 to supply hydrogen to the gas generator 208.

The oxygen circuit includes a storage reservoir 214 from which the oxygen is pumped through a turbopump 215. The oxygen flow downstream of the turbopump 215 is divided into circuits 216 and 217. Circuit 216 supplies oxygen to the gas generator 208 while circuit 217, controlled by valve 218, supplies oxygen to the rocket motor 9.

The combustion exhaust gases from generator 208 are divided into circuits 219 and 220. Circuit 219 supplies the exhaust gases to drive turbopumps 202 and 215 while circuit 220, controlled by valve 221 supplies the exhaust gases to drive gas driven turbine 6. As in the previous embodiment, the exhaust from gas driven turbine 6 is supplied to interior manifold 15 and the upstream cavities of the radial arms 14 as well as injection rings 19 and 20.

The exhausts from turbopumps 202 and 215 may be supplied to the downstream cavities 14f of the radial arms through control valve 222 when the propulsion system is operated in the turbojet and ramjet modes. When it is operated in the rocket mode, valve 223 is opened to vent the discharged hydrogen to the ambient atmosphere.

The open and closed states of the various valves for the different operational modes are summarized in the following table.

TABLE 2

| OPERATIONAL MODE | VALVES | | | | | | |
|---|---|---|---|---|---|---|---|
| | 204 | 205 | 210 | 218 | 221 | 222 | 223 |
| TURBOJET GAS GENERATOR | O | F | O | F | O | O | F |
| RAMJET GAS GENERATOR | O | F | O | F | F | O | F |

TABLE 2-continued

| OPERATIONAL MODE | VALVES | | | | | | |
|---|---|---|---|---|---|---|---|
| | 204 | 205 | 210 | 218 | 221 | 222 | 223 |
| ROCKET | F | O | F | O | F | F | O |

At startup, turbopumps 202 and 215 are driven by a known starter device (not shown). The entire flow of hydrogen emanating from turbopump 202 passes through heat exchanger 206 and is then supplied to the gas generator 208. Oxygen is also supplied to the gas generator 208 through circuit 216 from turbopump 215. The combustion gases from the generator 208 are used to drive the turbopumps 202 and 215, as well as to drive gas driven turbine 6 which, in turn, drives air compressor 4. The exhaust gases from gas driven turbine 6, having an excess of hydrogen, are injected into the combustion chamber via injection device 13 as in the previously described embodiment. The exhaust gas used to drive turbines 202 and 215 is also injected into the compressed air stream via the injection device 13 to be mixed with the compressed air.

In the ramjet mode, valves 204 and 210 are open, while valves 205 and 221 are closed to feed a portion of the hydrogen directly into the injection device 13 through circuit 209. The remaining portion of the hydrogen flow passing through heat exchanger 206 is supplied to the gas generator 208. Since, in the ramjet mode, operation of the compressor 4 and the gas driven turbine 6 is not necessary, valve 221 is closed. Injection device 13 thoroughly mixes the vaporized hydrogen from circuit 209 and the combustion gases emanating from generator 208.

In the rocket mode, valves 204, 210, 221 and 222 are closed. The hydrogen flow is directed into rocket motor 9 via circuit 211 and to gas generator 208 via circuits 212 and 207. Oxygen is fed to the gas generator 208 through circuit 215 and to the rocket motor 9 via circuit 217 passing through open valve 218.

In the turbojet and ramjet operational modes using either type of feed circuits (expander or gas generator) the injection device 13 assures a good injection of the fuel and also allows the transition between the two modes of operation since the downstream cavities 14f and the second cavities 19b and 20b are continuously fed during both modes of operation.

The orientation of the injector rings 19 and 20, as illustrated in FIG. 6, in which the non-planar surfaces face each other and in which the trailing edges are arranged downstream of the trailing edges 14b of the arms 14 enables proper ignition and burning of the fuel in both turbojet and ramjet operational modes, as well as good distribution of the fuel mixture throughout the circumference of the duct 1. Although the injection device 13 has been described in combination with a combined turbojet-ramjet-rocket propulsion system, it could also be used with a combination turbojet-ramjet propellant system which does not include rocket motor 9

The foregoing description is provided for illustrative purposes only and should not be construed as in any way limiting this invention, the scope of which is defined solely by the appended claims.

What is claimed is:

1. A combination turbojet-ramjet-rocker propulsion system having a combustion chamber and an air intake duct means to direct air into the combustion chamber defined between a central body and an external housing comprising:

a) air compressor means located in the air intake duct upstream of the combustion chamber to generate a compressed air stream passing into the combustion chamber;

b) gas driven turbine means located in the central body and operatively connected to the air compressor to drive the air compressor and having the exhaust means;

c) means to supply a pressurized gas to drive the gas driven turbine;

d) a source of combustible fuel;

e) injection means located in the combustion chamber downstream of the air compressor means in communication with the source of combustible fuel and the exhaust means of the gas driven turbine means to inject at least one of the combustible fuel and the exhaust from the gas driven turbine means into the compressed air stream when the system is operated in the turbojet and ramjet modes wherein the injection means comprises;

i) an injection device comprising a plurality of arms extending generally radially between the central body and the external housing having an aerodynamic cross-section with an extrados and an intrados extending between a leading edge and a trailing edge, each arm defining at least one interior radially extending cavity in communication with the gas driven turbine to allow exhaust gases from the gas driven turbine to pass into the cavity; and ii) a plurality of injection orifices defined in the intrados and communicating with the at least one internal cavity to inject the exhaust gases in the cavity into the air stream passing into the combustion chamber;

f) rocket motor means located in a downstream portion of the central body;

g) adjustable exhaust nozzle means in communication with the combustion chamber and the rocket motor; and, h) adjustment means operatively associated with the exhaust nozzle means to adjust the nozzle between a variable throat convergent-divergent nozzle in the turbojet and ramjet modes and a divergent nozzle in the rocket mode.

2. The propulsion system according to claim 1 wherein the air compressor means and the gas driven turbine means are of the axial type.

3. The propulsion system according to claim 2 wherein the air compressor has two contrarotating stages comprising an upstream stage and a downstream stage.

4. The propulsion system according to claim 3 wherein the gas driven turbine compresses a first turbine rotor having n stages and a second turbine rotor having (n−1) stages.

5. The propulsion system according to claim 4 further comprising:

a) a first shaft operatively connecting the first turbine rotor to the upstream stage of the air compressor; and, b) a second shaft concentrically arranged with the first shaft and operatively connecting the second turbine rotor to the downstream stage of the air compressor.

6. The propulsion system according to claim 5 further comprising:

a) a plurality of support struts extending in a generally radial direction to support the central body within the external housing;

b) collector ring means communicating with an inlet of the gas driven turbine; and, c) conduit means passing through at least one of the support struts communicating with the collector ring means and the means to supply the pressurized gas to the gas driven turbine.

7. The propulsion system according to claim 6 further comprising exhaust gas duct means interconnecting the gas driven turbine exhaust means and the injection means.

8. The propulsion system according to claim 7 wherein the means to supply a pressurized gas to the gas driven turbine comprises:

a) a source of hydrogen;

b) hydrogen distribution circuit means;

c) a turbopump interconnecting the hydrogen source and distribution circuit to pump the hydrogen through the hydrogen distribution circuit, the turbopump having a turbine portion driven by the hydrogen and a turbine exhaust; and, d) circuit means interconnecting the turbine exhaust and the conduit means passing through at least one of the support struts to supply the gas driven turbine with exhaust from the turbopump turbine.

9. The propulsion system according to claim 8 wherein the turbopump is affixed to the exterior of the external housing adjacent to a support strut.

10. The propulsion system according to claim 7 wherein the means to supply a pressurized gas to the gas driven turbine comprises:

a) a source of hydrogen;

b) a source of oxygen;

c) a gas generator connected to the sources of hydrogen and oxygen and having an exhaust; and, d) circuit means connecting the exhaust of the gas generator to the conduit means passing through the at least one of the support struts to direct the exhaust from the gas generator to the gas driven turbine.

11. The propulsion system according to claim 10 wherein the gas generator is attached to the exterior of the external housing.

12. The propulsion system according to claim 1 further comprising heat exchanger means located on an exterior portion of the external housing, the heat exchanger means having inlet means connected to the source of combustible fuel and outlet means connected to at least one of the means to supply the pressurized gas to the gas driven turbine end of the injection means.

13. The propulsion system according to claim wherein each radially extending arm defines upstream and downstream internal cavities such that the upstream cavity communicates with the gas driven turbine to allow exhaust gas from the gas driven turbine to pass into the upstream internal cavity and the downstream cavity communicates with the pressurized gas supply means to allow pressurized gas to pass into the downstream cavity and further comprising:

a) a plurality of first injection orifices defined in the intrados and communicating with the upstream internal cavity; and, b) a plurality of second injection orifices defined in the intrados and communicating with the downstream internal cavity to inject the gases in the cavities into the air stream passing into the combustion chamber.

14. The propulsion system according to claim 13 further comprising a pair of generally concentric injection rings attached to the arms and extending around the central housing, each ring having first and second internal cavities in communication with the upstream and downstream internal cavities, respectively, of each arm.

15. The propulsion system according to claim 14 wherein each injection ring has internally and externally facing surfaces and further comprising a plurality of injection openings defined by the internally and externally facing surfaces in communication with the first and second internal cavities.

16. The propulsion system according to claim 15 wherein the injection openings are inclined in a downstream direction.

17. The propulsion system according to claim 16 wherein each ring has at least one non-planar surface.

18. The propulsion system according to claim 17 wherein the injection rings are oriented such that the non-planar surfaces face each other.

19. The propulsion system according to claim 1 wherein the means to supply a pressurized gas comprises a gas generator.

20. The propulsion system according to claim 19 further comprising:
 a) a source of hydrogen;
 b) a source of oxygen;
 c) first circuit means interconnecting the hydrogen source to the injection means;
 d) second circuit means interconnecting the hydrogen source to the rocket motor;
 e) third circuit means interconnecting the hydrogen source to the gas generator;
 f) fourth circuit means interconnecting the oxygen source to the rocket motor;
 g) fifth circuit means interconnecting the oxygen source to the gas generator;
 h) sixth circuit means interconnecting the exhaust of the gas generator to the gas driven turbine inlet;
 i) seventh circuit means connecting the gas driven turbine to the injection means and,
 j) valve control means operatively associated with the circuits such that; in the turbojet mode of operation gas passes through the gas driven turbine and is supplied to the injection means and hydrogen is supplied to the injection means; in the ramjet mode of operation only hydrogen is supplied to the injection means; in the ramjet mode of operation only hydrogen is supplied to the injection means; and in the rocket mode of operation hydrogen and oxygen are supplied only to the rocket motor.

21. The propulsion system according to claim 1 further comprising:
 a) a source of hydrogen;
 b) a source of oxygen;
 c) first circuit means interconnecting the hydrogen source to the injection means;
 d) second circuit means interconnecting the hydrogen source to the rocket motor;
 e) an expander regenerating circuit;
 f) third circuit means interconnecting the hydrogen source to the expander regenerating circuit;
 g) fourth circuit means interconnecting the expander regenerating circuit to the gas driven turbine;
 h) fifth circuit means interconnecting the oxygen source and the rocket motor;
 i) sixth circuit means connecting the exhaust of the gas driven turbine to the injector means; and
 j) valve control means operatively associated with the circuits such that: in the turbojet mode of operation pressurized gas passes through the gas driven turbine and is supplied to the injection means and hydrogen is supplied to the injection means; in the ramjet mode of operation only hydrogen is supplied to the injection means; and in the rocket mode of operation hydrogen and oxygen are supplied only to the rocket motor.

22. The propulsion system according to claim 1 wherein the adjustable nozzle means comprises:
 a) a first divergent nozzle portion fixedly attached to and extending downstream from the rocket motor;
 b) a second divergent nozzle portion movable between extended and retracted positions;
 c) a third divergent nozzle portion fixedly attached to a downstream portion of the external housing and axially spaced from the first divergent nozzle portion to define a gap therebetween;
 d) actuating means operatively associated with the second divergent nozzle portion to move it between its retracted position wherein it is displaced from the gap and its extended position wherein it closes the gap and connects the first and third divergent nozzle portions to form a divergent nozzle in the rocket mode; and
 e) a fourth movable nozzle portion which extends into the gap when the second divergent nozzle portion is retracted to form a convergent-divergent nozzle with the external housing and the third divergent nozzle portion in the turbojet and ramjet modes.

23. The propulsion system according to claim 22 further comprising means to axially adjust the position of the fourth nozzle portion to vary the cross-sectional area of the throat of the convergent-divergent nozzle.

24. The propulsion system according to claim 22 wherein the fourth nozzle portion comprises:
 a) a support ring mounted for axial movement on the central body;
 b) a plurality of nozzle flaps pivotally attached to and extending from a downstream end of the support ring;
 c) first actuator means operatively associated with the support ring to move the support ring and the flaps axially relative to the external housing.

25. The propulsion system according to claim 24 wherein the first actuator comprises a jack screw having a housing fixedly attached to the central body and an extendable and retractable shaft.

26. The propulsion system according to claim 24 wherein the actuating means to move the second divergent nozzle portion comprises a second actuator attached to the support ring and to the second divergent nozzle portion.

27. The propulsion system according to claim 24 wherein the second actuator comprises a jack screw having a housing fixedly attached to the support ring and an extendable and retractable shaft connected to the second divergent nozzle portion.

28. The propulsion system according to claim 27 further comprising:

a) support rails fixedly attached to the central body and extending substantially in an axial direction; and, b) wheeled means attached to the support ring and bearing on the support rails to axially, movably support the support ring on the central body.

29. A combination turbojet-ramjet-rocker propulsion system having a combustion chamber and an air intake duct means to direct air into the combustion chamber defined between a central body and an external housing comprising;

a) axial type air compressor means located in the air intake duct upstream of the combustion chamber to generate a compressed air stream passing into the combustion chamber the air compressor having two contrarotating stages comprising an upstream stage and a downstream stage;

b) axial type gas driven turbine means located in the central body, the gas driven turbine having: a first turbine rotor having n stages; a second turbine rotor having (n−1) stages; and exhaust means;

c) a first shaft operatively connecting the first turbine rotor to the upstream stage of the air compressor;

d) a second shaft concentrically arranged with the first shaft and operatively connecting the second turbine rotor to the downstream stage of the air compressor;

e) a plurality of support struts extending in a generally radial direction to support the central body within the external housing;

f) collector ring means communicating with an inlet of the gas driven turbine;

g) conduit means passing through at least one of the support struts communicating with the collector ring means and the means to supply the pressurized gas to the gas driven turbine;

h) means to supply a pressurized gas to drive the gas driven turbine comprising:
  i) a source of hydrogen;
  ii) hydrogen distribution circuit means;
  iii) a turbopump interconnecting the hydrogen source and distribution circuit to pump the hydrogen through the hydrogen distribution circuit, the turbopump having a turbine portion driven by the hydrogen and a turbine exhaust; and,
  iv) circuit means interconnecting the turbine exhaust and the conduit means passing through at least one of the support struts to supply the gas driven turbine with exhaust from the turbopump turbine;

i) a source of combustible fuel;

j) injection means located in the combustion chamber downstream of the air compressor means in communication with the source of combustible fuel and the exhaust means of the gas driven turbine means to inject at least one of the combustible fuel and the exhaust from the gas driven turbine means into the compressed air stream when the system is operated in the turbojet and ramjet modes;

k) exhaust gas duct means interconnecting the gas driven turbine exhaust means and the injection means;

l) rocket motor means located in a downstream portion of the central body;

m) adjustable exhaust nozzle means in communication with the combustion chamber and the rocket motor; and n) adjustment means operatively associated with the exhaust nozzle means to adjust the nozzle between a variable throat convergent-divergent nozzle in the turbojet and ramjet modes and a divergent nozzle in the rocket mode.

30. The propulsion system according to claim 29 wherein the turbopump is affixed to the exterior of the external housing adjacent to a support strut.

31. The propulsion system according to claim 29 further comprising heat exchanger means located on an exterior portion of the external housing, the heat exchanger means having inlet means connected to the source of combustible fuel and outlet means connected to at least one of the means to supply the pressurized gas to the gas driven turbine end of the injection means.

32. The propulsion system according to claim 29 wherein the injection means comprises:

a) an injection device comprising a plurality of arms extending generally radially between the central body and the external housing having an aerodynamic cross-section with an extrados and an intrados extending between a leading edge and a trailing edge, each arm defining at least one interior radially extending cavity in communication with the gas driven turbine to allow exhaust gases from the gas driven turbine to pass into the cavity; and, b) a plurality of injection orifices defined in the intrados and communicating with the at least one internal cavity to inject the exhaust gases in the cavity into the air stream passing into the combustion chamber.

33. The propulsion system according to claim 32 wherein each radially extending arm defines upstream and downstream internal cavities such that the upstream cavity communicates with the gas driven turbine to allow exhaust gas from the gas driven turbine to pass into the upstream internal cavity and the downstream cavity communicates with the pressurized gas supply means to allow pressurized gas to pass into the downstream cavity and further comprising:

a) a plurality of first injection orifices defined in the intrados and communicating with the upstream internal cavity; and, b) a plurality of second injection orifices defined in the intrados and communicating with the downstream internal cavity to inject the gases in the cavities into the air stream passing into the combustion chamber.

34. The propulsion system according to claim 33 further comprising a pair of generally concentric injection rings attached to the arms and extending around the central housing, each ring having first and second internal cavities in communication with the upstream and downstream internal cavities, respectively, of each arm.

35. The propulsion system according to claim 34 wherein each injection ring has internally and externally facing surfaces and further comprising a plurality of injection openings defined by the internally and externally facing surfaces in communication with the first and second internal cavities.

36. The propulsion system according to claim 35 wherein the injection openings are inclined is a downstream direction.

37. The propulsion system according to claim 36 wherein each ring has at least one non-planar surface.

38. The propulsion system according to claim 37 wherein the injection rings are oriented such that the non-planar surfaces face each other.

39. The propulsion system according to claim 29 further comprising:
a) a source of hydrogen;
b) a source of oxygen;
c) first circuit means interconnecting the hydrogen source to the injection means;
d) second circuit means interconnecting the hydrogen source to the rocket motor;
e) an expander regenerating circuit;
f) third circuit means interconnecting the hydrogen source to the expander regenerating circuit;
g) fourth circuit means interconnecting the expander regenerating circuit to the gas driven turbine;
h) fifth circuit means interconnecting the oxygen source and the rocket motor;
i) sixth circuit means connecting the exhaust of the gas driven turbine to the injector means; and
j) valve control means operatively associated with the circuits such that: in the turbojet mode of operation pressurized gas passes through the gas driven turbine and is supplied to the injection means and hydrogen is supplied to the injection means; in the ramjet mode of operation only hydrogen is supplied to the injection means; and in the rocket mode of operation hydrogen and oxygen are supplied only to the rocket motor.

40. The propulsion system according to claim 29 wherein the adjustable nozzle means comprises:
a) a first divergent nozzle portion fixedly attached to and extending downstream from the rocket motor;
b) a second divergent nozzle portion movable between extended and retracted positions;
c) a third divergent nozzle portion fixedly attached to a downstream portion of the external housing and axially spaced from the first divergent nozzle portion to define a gap therebetween;
d) actuating means operatively associated with the second divergent nozzle portion to move it between its retracted position wherein it is displaced from the gap and its extended position wherein it closes the gap and connects the first and third divergent nozzle portions to form a divergent nozzle in the rocket mode; and
e) a fourth movable nozzle portion which extends into the gap when the second divergent nozzle portion is retracted to form a convergent-divergent nozzle with the external housing and the third divergent nozzle portion in the turbojet and ramjet modes.

41. The propulsion system according to claim 40 further comprising means to axially adjust the position of the fourth nozzle portion to vary the cross-sectional area of the throat of the convergent-divergent nozzle.

42. The propulsion system according to claim 41 wherein the fourth nozzle portion comprises:
a) a support ring mounted for axial movement on the central body;
b) a plurality of nozzle flaps pivotally attached to and extending from a downstream end of the support ring;
c) first actuator means operatively associated with the support ring to move the support ring and the flaps axially relative to the external housing.

43. The propulsion system according to claim 42 wherein the first actuator comprises a jack screw having a housing fixedly attached to the central body and an extendable and retractable shaft.

44. The propulsion system according to claim 42 wherein the actuating means to move the second divergent nozzle portion comprises a second actuator attached to the support ring and to the second divergent nozzle portion.

45. The propulsion system according to claim 42 wherein the second actuator comprises a jack screw having a housing fixedly attached to the support ring and an extendable and retractable shaft connected to the second divergent nozzle portion.

46. The propulsion system according to claim 45 further comprising:
a) support rails fixedly attached to the central body and extending substantially in an axial direction; and,
b) wheeled means attached to the support ring and bearing on the support rails to axially, movably support the support ring on the central body.

47. The combination turbojet-ramjet-rocket propulsion system having a combustion chamber and an air intake duct means to direct air into the combustion chamber defined between a central body and an external housing comprising:
a) air compressor means located in the air intake duct upstream of the combustion chamber to generate a compressed air stream passing into the combination chamber;
b) gas driven turbine means located in the central body and operatively connected to the air compressor to drive the air compressor and having exhaust means;
c) means to supply a pressurized gas to drive the gas driven turbine;
d) a source of combustible fuel;
e) injection means located in the combustion chamber downstream of the air compressor means in communication with the source of combustible fuel and the exhaust means of the gas driven turbine means to inject at least one of the combustible fuel and the exhaust from the gas driven turbine means into the compressed air stream when the system is operated in the turbojet and ramjet modes;
f) rocket motor means located in a downstream portion of the central body;
g) adjustable exhaust nozzle means in communication with the combustion chamber and the rocket motor;
h) adjustment means operatively associated with the exhaust nozzle means to adjust the nozzle between a variable throat convergent-divergent nozzle in the turbojet and ramjet modes and a divergent nozzle in the rocket mode.
i) a source of hydrogen;
j) a source of oxygen;
k) first circuit means interconnecting the hydrogen source to the injection means;
l) second circuit means interconnecting the hydrogen source to the rocket motor;
m) an expander regenerating circuit;
n) third circuit means interconnecting the hydrogen source to the expander regenerating circuit;
o) fourth circuit means interconnecting the expander regenerating circuit to the gas driven turbine;
p) fifth circuit means interconnecting the oxygen source and the rocket motor;

q) sixth circuit means connecting the exhaust of the gas driven turbine to the injector means; and r) valve control means operatively associated with the circuit such that: in the turbojet mode of operation pressurized gas passes through the gas driven turbine and is supplied to the injection means and hydrogen is supplied to the injection means; in the ramjet mode of operation only hydrogen is supplied to the injection means; and in the rocket mode of operation hydrogen and oxygen are supplied only to the rocket motor.

48. The propulsion system according to claim 47 wherein the air compressor means and the gas driven turbine means are of the axial type.

49. The propulsion system according to claim 48 wherein the air compressor has two contrarotating stages comprising an upstream stage and a downstream stage.

50. The propulsion system according to claim 49 wherein the gas driven turbine compresses a first turbine rotor having n stages and a second turbine rotor having (n−1) stages.

51. The propulsion system according to claim 50 further comprising:
a) a first shaft operatively connecting the first turbine rotor to the upstream stage of the air compressor; and,
b) a second shaft concentrically arranged with the first shaft and operatively connecting the second turbine rotor to the downstream stage of the air compressor.

52. The propulsion system according to claim 51 further comprising:
a) a plurality of support struts extending in a generally radial direction to support the central body within the external housing;
b) collector ring means communicating with an inlet of the gas driven turbine; and,
c) conduit means passing through at least one of the support struts communicating with the collector ring means and the means to supply the pressurized gas to the gas driven turbine.

53. The propulsion system according to claim 52 further comprising exhaust gas duct means interconnecting the gas driven turbine exhaust means and the injection means.

54. The propulsion system according to claim 53 wherein the means to supply a pressurized gas to the gas driven turbine comprises:
a) hydrogen distribution circuit means;
b) a turbopump interconnecting the hydrogen source and distribution circuit to pump and hydrogen through the hydrogen distribution circuit, the turbopump having a turbine portion driven by the hydrogen and a turbine exhaust; and,
c) circuit means interconnecting the turbine exhaust and the conduit means passing through at least one of the support struts to supply the gas driven turbine with exhaust from the turbopump turbine.

55. The propulsion system according to claim 54 wherein the turbopump is affixed to the exterior of the external housing adjacent to a support strut.

56. The propulsion system according to claim 47 further comprising heat exchanger means located on an exterior portion of the external housing, the heat exchanger means having inlet means connected to the source of combustible fuel and outlet means connected to at least one of the means to supply the pressurized gas to the gas driven turbine end of the injection means.

57. The propulsion system according to claim 47 wherein the injection means comprises:
a) an injection device comprising a plurality of arms extending generally radially between the central body and the external housing having an aerodynamic cross-section with an extrados and an intrados extending between a leading edge and a trailing edge, each arm defining at least one interior radially extending cavity in communication with the gas driven turbine to allow exhaust gases from the gas driven turbine to pass into the cavity; and,
b) a plurality of injection orifices defined in the intrados and communicating with the at least one internal cavity to inject the exhaust gases in the cavity into the air stream passing into the combustion chamber.

58. The propulsion system according to claim 57 wherein each radially extending arm defines upstream and downstream internal cavities such that the upstream cavity communicates with the gas driven turbine to allow exhaust gas from the gas driven turbine to pass into the upstream internal cavity and the downstream cavity communicates with the pressurized gas supply means to allow pressurized gas to pass into the downstream cavity and further comprising:
a) a plurality of first injection orifice defined in the intrados and communicating with the upstream internal cavity; and,
b) a plurality of second injection orifices defined in the intrados and communicating with the downstream internal cavity to the inject the gases in the cavities into the air stream passing into the combustion chamber.

59. The propulsion system according to claim 58 further comprising a pair of generally concentric injection rings attached to the arms and extending around the central housing, each ring having first and second internal cavities in communication with the upstream and downstream internal cavities, respectively, of each arm.

60. The propulsion system according to claim 59 wherein each injection ring has internally and externally facing surfaces and further comprising a plurality of injection openings defined by the internally and externally facing surfaces in communication with the first and second internal cavities.

61. The propulsion system according to claim 60 wherein the injection openings are inclined in a downstream direction.

62. The propulsion system according to claim 61 wherein each ring has at least one non-planar surface.

63. The propulsion system according to claim 62 wherein the injection rings are oriented such that the non-planar surfaces face each other.

64. The propulsion system according to claim 47 wherein the adjustable nozzle means comprises:
a) a first divergent nozzle portion fixedly attached to and extending downstream from the rocket motor;
b) a second divergent nozzle portion movable between extended and retracted positions;
c) a third divergent nozzle portion fixedly attached to a downstream portion of the external housing and axially spaced from the first divergent nozzle portion to define a gap therebetween;
d) actuating means operatively associated with the second divergent nozzle portion to move it between its retracted position wherein it is displaced from the gap and its extended position wherein it closes the gap and connects the first and third divergent nozzle portions to form a divergent nozzle in the rocket mode; and e) a fourth movable nozzle portion which extends into the gap when the second divergent nozzle portion is retracted to form a convergent-divergent nozzle with the external housing and the third divergent nozzle portion in the turbojet and ramjet modes.

65. The propulsion system according to claim 64 further comprising means to axially adjust the position of the fourth nozzle portion to vary the cross-sectional area of the throat of the convergent-divergent nozzle.

66. The propulsion system according to claim 65 wherein the fourth nozzle portion comprises:
  a) a support ring mounted for axial movement on the central body;
  b) a plurality of nozzle flaps pivotally attached to and extending from a downstream end of the support ring;
  c) first actuator means operatively associated with the support ring to move the support ring and the flaps axially relative to the external housing.

67. The propulsion system according to claim 66 wherein the first actuator comprises a jack screw having a housing fixedly attached to the central body and an extendable and retractable shaft.

68. The propulsion system according to claim 66 wherein the actuating means to move the second divergent nozzle portion comprises a second actuator attached to the support ring and to the second divergent nozzle portion.

69. The propulsion system according to claim 66 wherein the second actuator comprises a jack screw having a housing fixedly attached to the support ring and an extendable and retractable shaft connected to the second divergent nozzle portion.

70. The propulsion system according to claim 69 further comprising:
  a) support rails fixedly attached to the central body and extending substantially in an axial direction; and,
  b) wheeled means attached to the support ring and bearing on the support rails to axially, movably support the support ring on the central body.

71. A combination turbojet-ramjet-rocket propulsion system having a combustion chamber and an air intake duct means to direct air into the combustion chamber defined between a central body and an external housing comprising:
  a) air compressor means located in the air intake duct upstream of the combustion chamber to generate a compressed air stream passing into the combustion chamber;
  b) gas driven turbine means located in the central body and operatively connected to the air compressor to drive the air compressor and having exhaust means;
  c) means to supply a pressurized gas to drive the gas driven turbine;
  d) a source of combustible fuel;
  e) injection means located in the combustion chamber downstream of the air compressor means in communication with the source of combustible fuel and the exhaust means of the gas driven turbine means to inject at least one of the combustible fuel and the exhaust from the gas driven turbine means into the compressed air stream when the system is operated in the turbojet and ramjet modes;
  f) rocket motor means located in a downstream portion of the central body;
  g) adjustable exhaust nozzle means in communication with the combustion chamber and the rocket motor wherein the adjustable nozzle means comprises:
    i) a first divergent nozzle portion fixedly attached to and extending downstream from the rocket motor;
    ii) a second divergent nozzle portion movable between extended and retracted positions;
    iii) a third divergent nozzle portion fixedly attached to a downstream portion of the external housing and axially spaced from the first divergent nozzle portion to define a gap therebetween;
    iv) actuating means operatively associated with the second divergent nozzle portion to move it between its retracted position wherein it is displaced from the gap and its extended position wherein it closes the gap and connects the first and third divergent nozzle portions to form a divergent nozzle in the rocket mode; and
    v) a fourth movable nozzle portion which extends into the gap when the second divergent nozzle portion is retracted to form a convergent-divergent nozzle with the external housing and the third divergent nozzle portion in the turbojet and ramjet modes; and,
  h) adjustment means operatively associated with the exhaust nozzle means to adjust the nozzle between a variable throat convergent-divergent nozzle in the turbojet and ramjet modes and a divergent nozzle in the rocket mode.

72. The propulsion system according to claim 71 wherein the air compressor means and the gas driven turbine means are of the axial type.

73. The propulsion system according to claim 72 wherein the air compressor has two contrarotating stages comprising an upstream stage and a downstream stage.

74. The propulsion system according to claim 73 wherein the gas driven turbine compresses a first turbine rotor having n stages and a second turbine rotor having (n−1) stages.

75. The propulsion system according to claim 74 further comprising:
  a) a first shaft operatively connecting the first turbine rotor to the upstream stage of the air compressor; and,
  b) a second shaft concentrically arranged with the first shaft and operatively connecting the second turbine rotor to the downstream stage of the air compressor.

76. The propulsion system according to claim 75 further comprising:
  a) a plurality of support struts extending in a generally radial direction to support the central body within the external housing;
  b) collector ring means communicating with an inlet of the gas driven turbine; and,
  c) conduit means passing through at least one of the support struts communicating with the collector ring means and the means to supply the pressurized gas to the gas driven turbine.

77. The propulsion system according to claim 76 further comprising exhaust gas duct means interconnecting the gas driven turbine exhaust means and the injection means.

78. The propulsion system according to claim 77 wherein the means to supply a pressurized gas to the gas driven turbine comprises:
 a) source of hydrogen;
 b) hydrogen distribution circuit means;
 c) a turbopump interconnecting the hydrogen source and distribution circuit to pump the hydrogen through the hydrogen distribution circuit, the turbopump having a turbine portion driven by the hydrogen and a turbine exhaust; and,
 d) circuit means interconnecting the turbine exhaust and the conduit means passing through at least one of the support struts to supply the gas driven turbine with exhaust from the turbopump turbine.

79. The propulsion system according to claim 78 wherein the turbopump is affixed to the exterior of the external housing adjacent to a support strut.

80. The propulsion system according to claim 77 wherein the means to supply a pressurized gas to the gas driven turbine comprises:
 a) a source of hydrogen;
 b) a source of oxygen;
 c) a gas generator connected to the source of hydrogen and oxygen and having an exhaust; and,
 d) circuit means connecting the exhaust of the gas generator to the conduit means passing through the at least one of the support struts to direct the exhaust from the gas generator to the gas driven turbine.

81. The propulsion system according to claim 80 wherein the gas generator is attached to the exterior of the external housing.

82. The propulsion system according to claim 71 further comprising heat exchanger means located on an exterior portion of the external housing, the heat exchanger means having inlet means connected to the source of combustible fuel and outlet means connected to at least one of the means to supply the pressurized gas to the gas driven turbine end of the injection means.

83. The properties system according to claim 71 wherein the injection means comprises:
 a) an injection device comprising a plurality of arms extending generally radially between the central body and the external housing having an aerodynamic cross-section with an extrados and an intrados extending between a leading edge and a trailing edge, each arm defining at least one interior radially extending cavity in communication with the gas driven turbine to allow exhaust gases from the gas driven turbine to pass into the cavity; and,
 b) a plurality of injection orifices defined in the intrados and communicating with the at least one internal cavity to inject the exhaust gases in the cavity into the air stream passing into the combustion chamber.

84. The propulsion system according to claim 83 wherein each radially extending arm defines upstream and downstream internal cavities such that the upstream cavity communicates with the gas driven turbine to allow exhaust gas from the gas driven turbine to pass into the upstream internal cavity and the downstream cavity communicates with the pressurized gas supply means to allow pressurized gas to pass into the downstream cavity and further comprising:
 a) a plurality of first injection orifices defined in the intrados and communicating with the upstream internal cavity; and,
 b) a plurality of second injection orifices defined in the intrados and communicating with the downstream internal cavity to inject the gases in the cavities into the air stream passing into the combustion chamber.

85. The propulsion system according to claim 84 further comprising a pair of generally concentric injection rings attached to the arms and extending around the central housing, each ring having first and second internal cavities in communication with the upstream and downstream internal cavities, respectively, of each arm.

86. The propulsion system according to claim 85 wherein each injection ring has internally and externally facing surfaces and further comprising a plurality of injection openings defined by the internally and externally facing surfaces in communication with the first and second internal cavities.

87. The propulsion system according to claim 86 wherein the injection openings are inclined in a downstream direction.

88. The propulsion system according to claim 87 wherein each ring has at least one non-planar surface.

89. The propulsion system according to claim 89 wherein the injection rings are oriented such that the non-planar surfaces face each other.

90. The propulsion system according to claim 81 wherein the means to supply a pressurized gas comprises a gas generator.

91. The propulsion system according to claim 90 further comprising:
 a) a source of hydrogen;
 b) a source of oxygen;
 c) first circuit means interconnecting the hydrogen source to the injection means;
 d) second circuit means interconnecting the hydrogen source to the rocket motor;
 e) third circuit means interconnecting the hydrogen source to the gas generator;
 f) fourth circuit means interconnecting the oxygen source to the rocket motor;
 g) fifth circuit means interconnecting the oxygen source to the gas generator;
 h) sixth circuit means interconnecting the exhaust of the gas generator to the gas driven turbine inlet;
 i) seventh circuit means connecting the gas driven turbine to the injection means and,
 j) valve control means operatively associated with the circuits such that; in the turbojet mode of operation gas passes through the gas driven turbine and is supplied to the injection means and hydrogen is supplied to the injection means; in the ramjet mode of operation only hydrogen is supplied to the injection means; in the ramjet mode of operation only hydrogen is supplied to the injection means; and in the rocket mode of operation hydrogen and oxygen are supplied only to the rocket motor.

92. The propulsion system according to claim 71 further comprising:
 a) a source of hydrogen;
 b) a source of oxygen;
 c) first circuit means interconnecting the hydrogen source to the injection means;
 d) second circuit means interconnecting the hydrogen source to the rocket motor;

e) an expander regenerating circuit;
f) third circuit means interconnecting the hydrogen source to the expander regenerating circuit;
g) fourth circuit means interconnecting the expander regenerating circuit to the gas driven turbine;
h) fifth circuit means interconnecting the oxygen source and the rocket motor;
i) sixth circuit means connecting the exhaust of the gas driven turbine to the injector means; and
j) valve control means operatively associated with the circuits such that: in the turbojet mode of operation pressurized gas passes through the gas driven turbine and is supplied to the injection means and hydrogen is supplied to the injection means; in the ramjet mode of operation only hydrogen is supplied to the injection means; and in the rocket mode of operation hydrogen and oxygen are supplied only to the rocket motor.

93. The propulsion system according to claim 71 further comprising means to axially adjust the position of the fourth nozzle portion to vary the cross-sectional area of the throat of the convergent-divergent nozzle.

94. The propulsion system according to claim 93 wherein the fourth nozzle portion comprises:
a) a support ring mounted for axial movement on the central body;
b) a plurality of nozzle flaps pivotally attached to and extending from a downstream end of the support ring;
c) first actuator means operatively associated with the support ring to move the support ring and the flaps axially relative to the external housing.

95. The propulsion system according to claim 94 wherein the first actuator comprises a jack screw having a housing fixedly attached to the central body and an extendable and retractable shaft.

96. The propulsion system according to claim 94 wherein the actuating means to move the second divergent nozzle portion comprise a second actuator attached to the support ring and to the second divergent nozzle portion.

97. The propulsion system according to claim 94 wherein the second actuator comprise a jack screw having a housing fixedly attached to the support ring and an extendable and retractable shaft connected to the second divergent nozzle portion.

98. The propulsion system according to claim 97 further comprising:
a) support rails fixedly attached to the central body and extending substantially in an axial direction; and,
b) wheeled means attached to the support ring and bearing on the support rails to axially, movably support the support ring on the central body.

* * * * *

UNITED STATES PATENT AND TRADEMARK OFFICE
CERTIFICATE OF CORRECTION

PATENT NO. : 5,052,176
DATED : October 1, 1991
INVENTOR(S) : LABATUT et al.

It is certified that error appears in the above-identified patent and that said Letters Patent is hereby corrected as shown below:

In the Abstract, line 4, after "gas" insert --driven--.

Col. 4, line 23, delete "is".

Col. 9, line 7, after "123", change "I" to --In--;
line 23, change "20" to --207--.

Col. 12, line 55, after "claim" insert --12--.

Col. 18, line 28, change "combination" to --combustion--.

Col. 20, line 28, change "orifice" to --orifices--.

Col. 21, line 40, change "69" to --66--.

Col. 23, line 44, change "properties" to --propulsion--.

Col. 24, line 27, change "89" to --88--.

Signed and Sealed this

Fifth Day of July, 1994

Attest:

BRUCE LEHMAN

*Attesting Officer*     *Commissioner of Patents and Trademarks*